Figure 1:
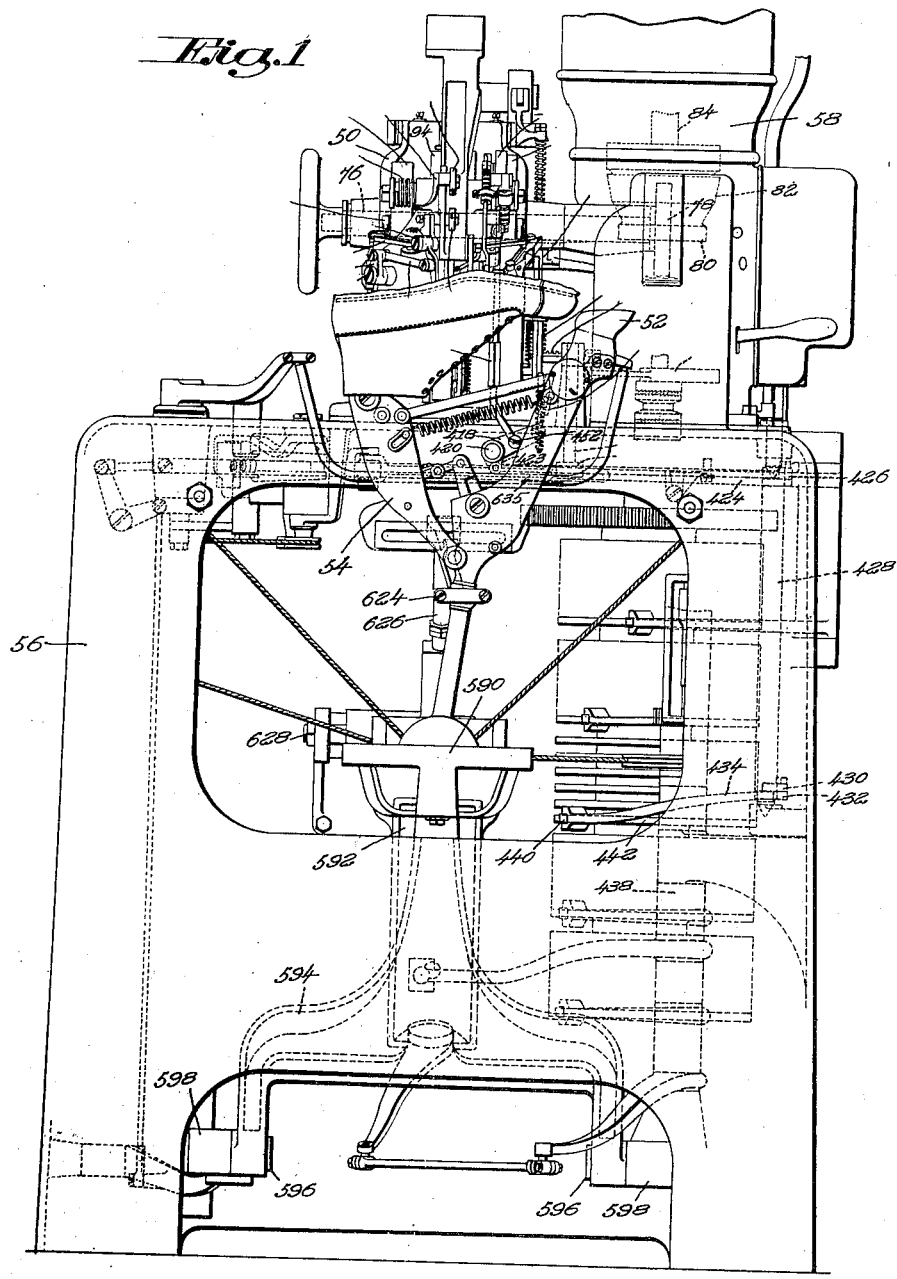

July 4, 1939. A. R. MORRILL 2,165,146
SHOE MACHINE
Original Filed Feb. 9, 1933 9 Sheets—Sheet 1

Inventor
Alfred R. Morrill
By Fish Hildreth Cary & Jenney
Attorneys

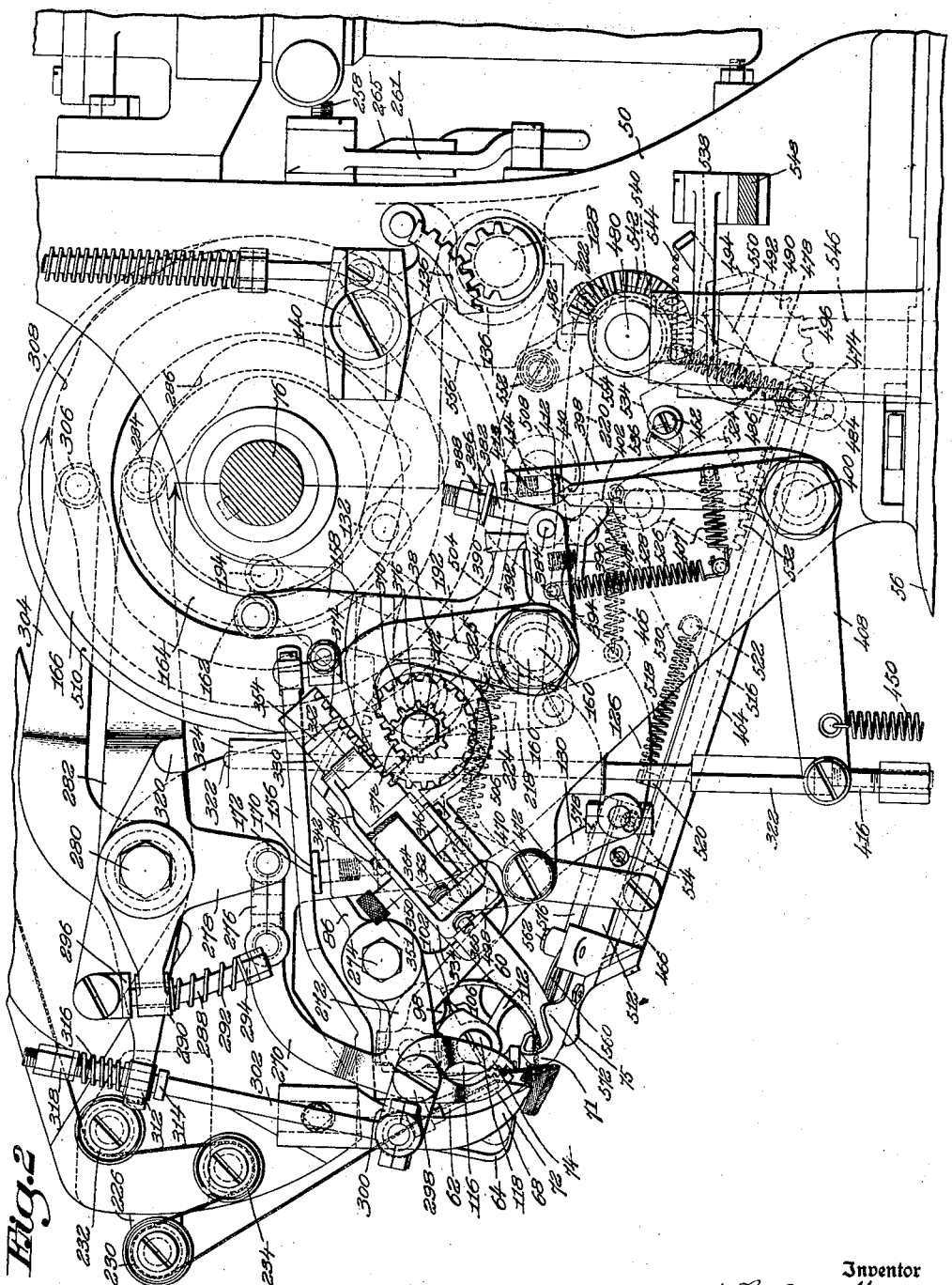

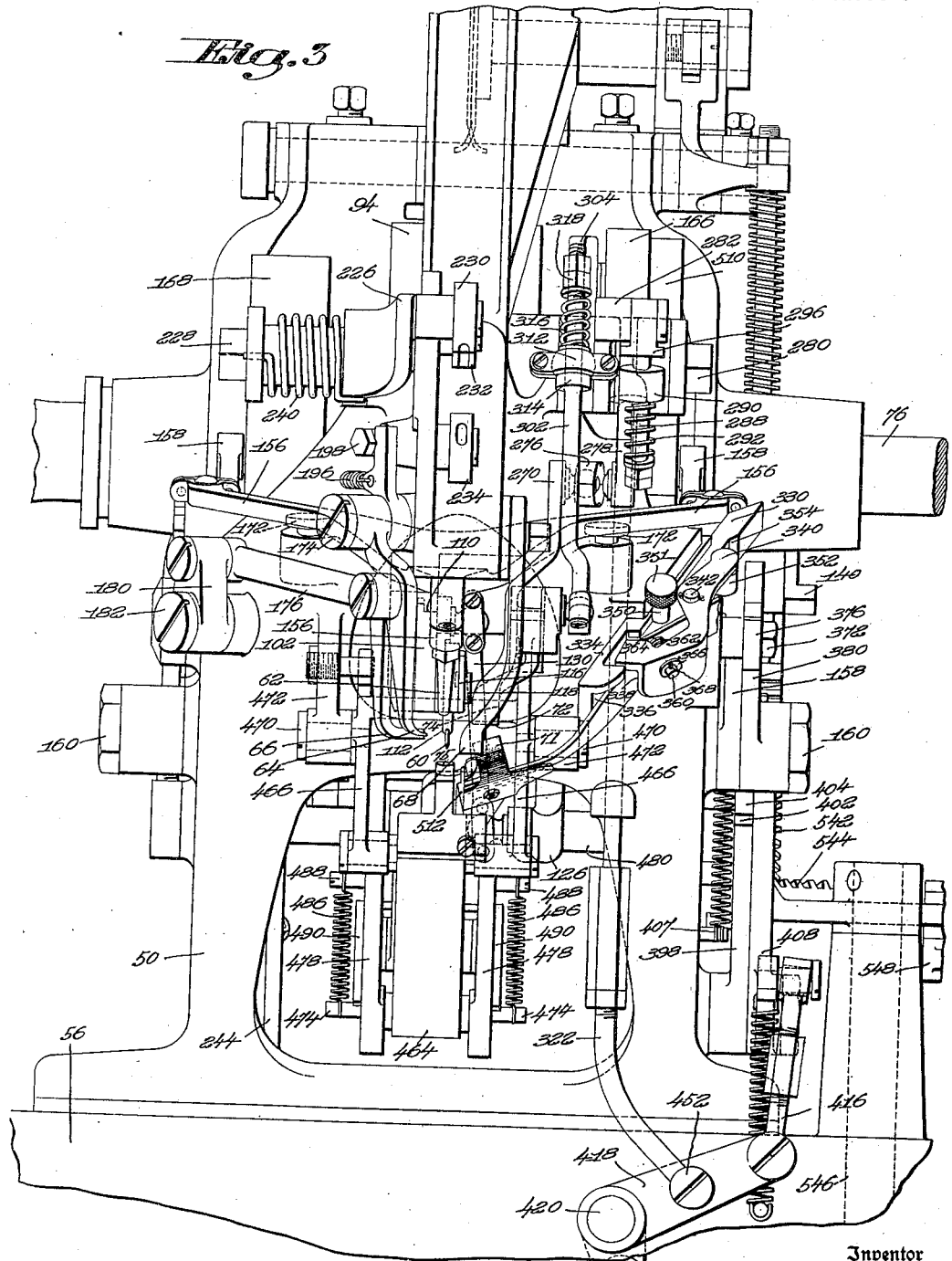

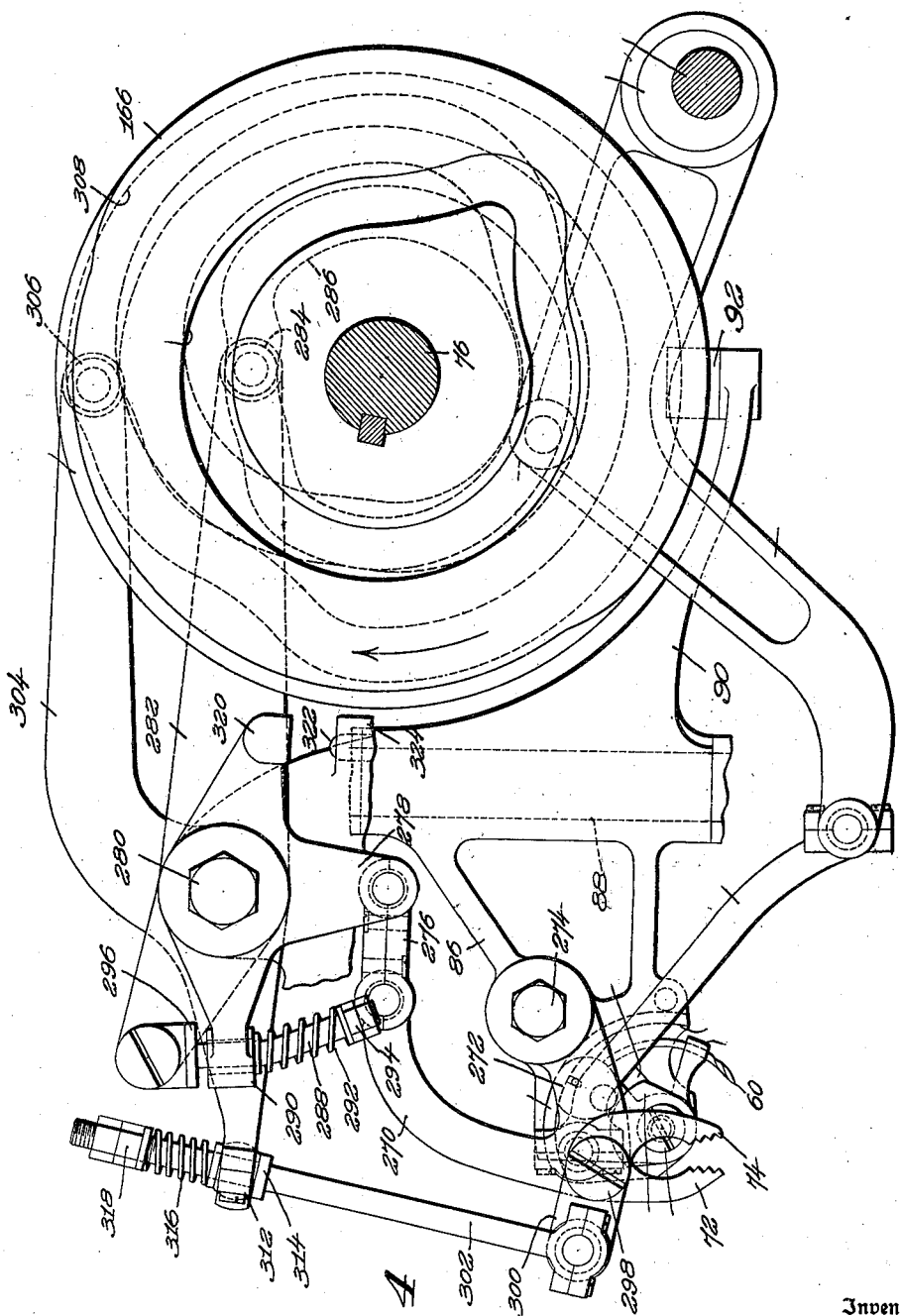

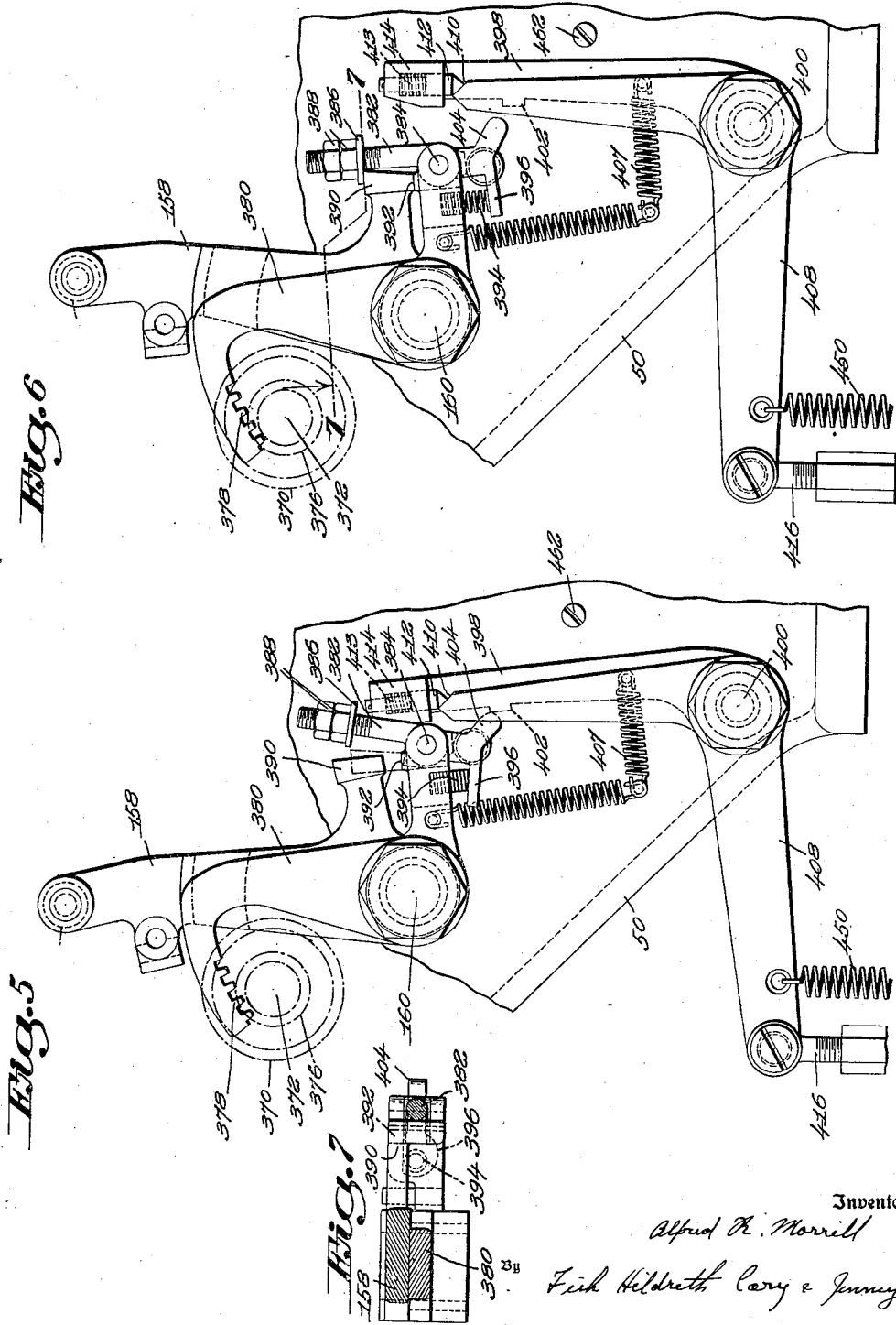

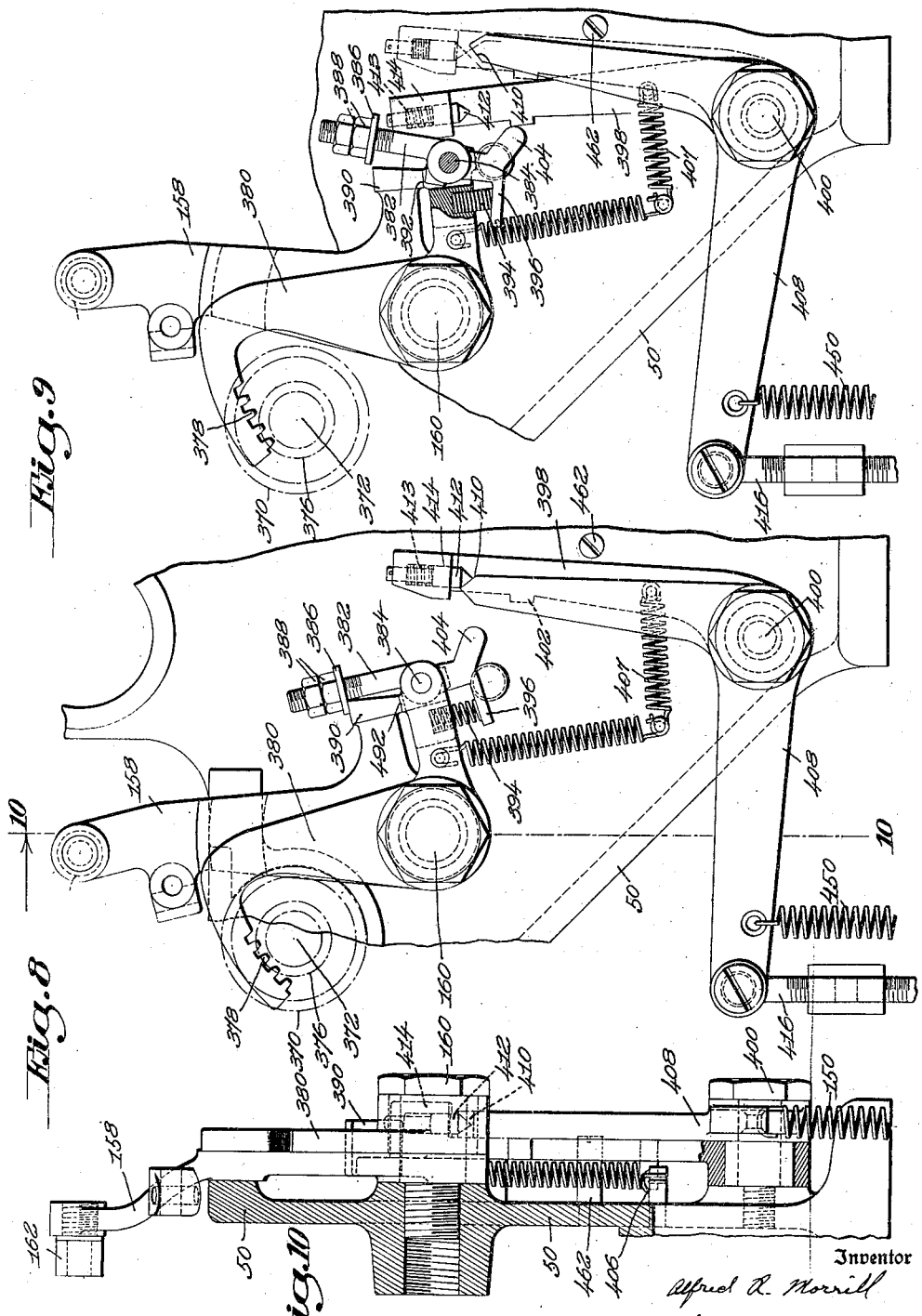

July 4, 1939.    A. R. MORRILL    2,165,146
SHOE MACHINE
Original Filed Feb. 9, 1933    9 Sheets-Sheet 7
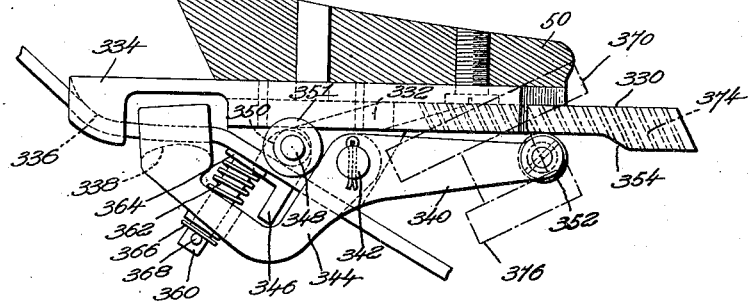
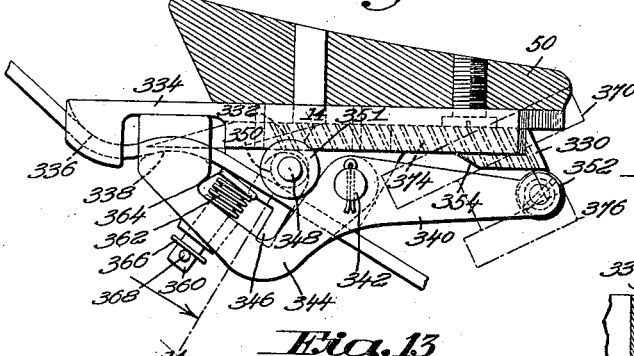
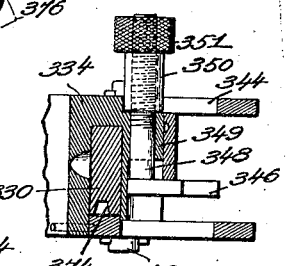
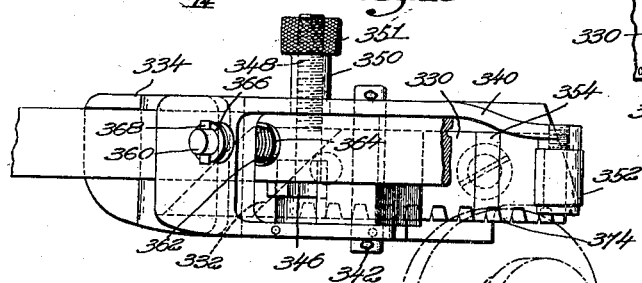
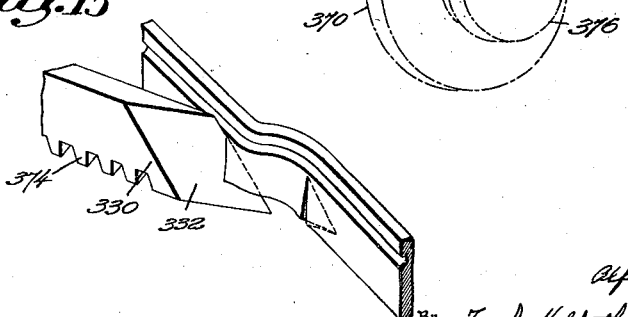
Inventor
Alfred R. Morrill
By Fish Hildreth Cary & Jenney
Attorneys July 4, 1939.  A. R. MORRILL  2,165,146
SHOE MACHINE
Original Filed Feb. 9, 1933   9 Sheets-Sheet 8
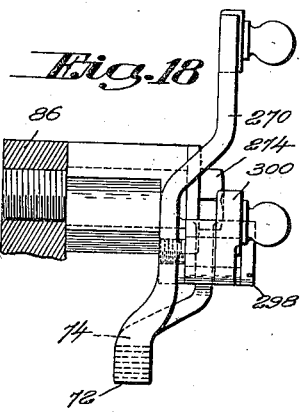
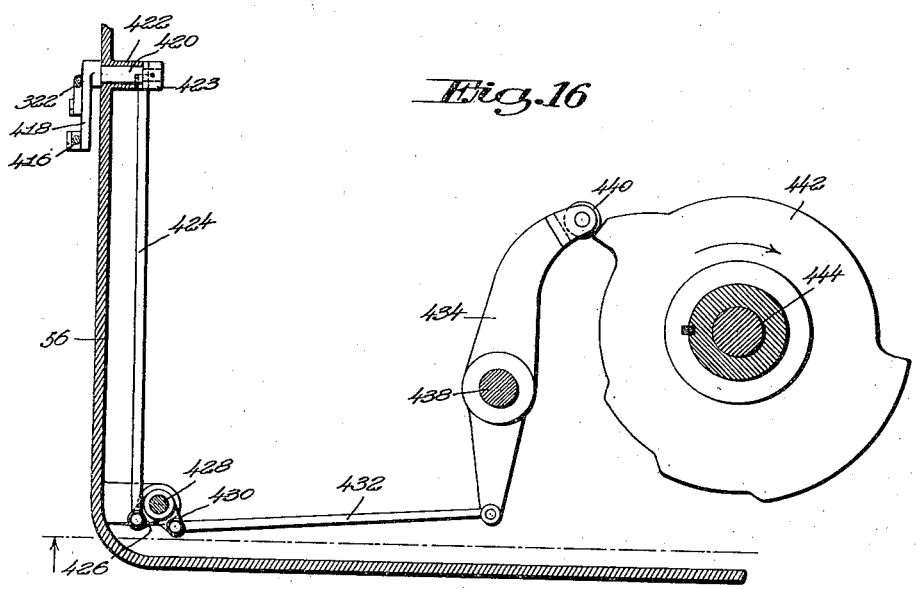

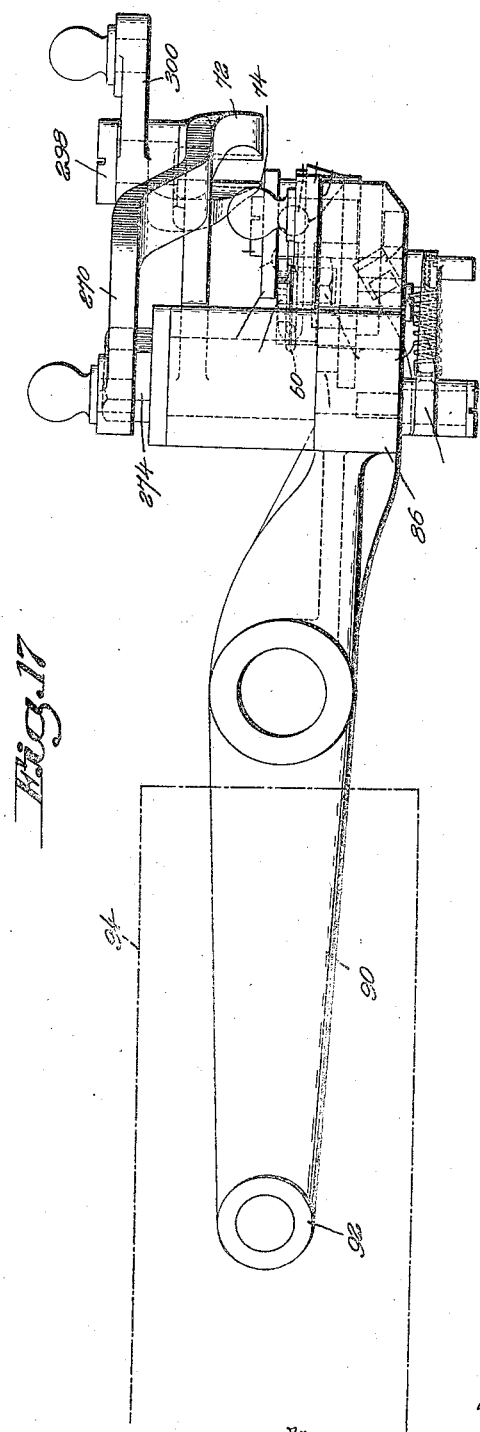

Patented July 4, 1939

2,165,146

UNITED STATES PATENT OFFICE 2,165,146

SHOE MACHINE

Alfred R. Morrill, Beverly, Mass., assignor to United Shoe Machinery Corporation, Paterson, N. J., a corporation of New Jersey Original application February 9, 1933, Serial No. 655,934. Divided and this application November 16, 1937, Serial No. 174,798

14 Claims. (Cl. 12—6)

The present invention relates to shoe machines, and is herein shown as embodied in a machine for operating on shoes of the type in which the shoe is supported on a jack and in which the jack and the means for operating on the shoe are moved relatively to transfer the point of operation about the shoe, and to change the relative positions of the shoe and the operating means to cause the shoe to be presented properly to the operating means as the point of operation is transferred about the shoe, all of the relative movements of the shoe and the operating means being produced and controlled by automatically acting mechanisms. While the several features of the present invention are particularly applicable to automatic shoe machines of the type above referred to, certain features of the invention are also capable of use in other types of automatic machines or in machines in which the shoe is held in position by the operator. It is also to be understood that except as defined in the claims, the several features of the invention are not limited to any particular construction or arrangement of parts.

The machine hereinafter specifically described as embodying the several features of the present invention is an automatic machine for sewing the welt and upper to the insole of a welted shoe. This machine is illustrated and described in greater detail in applicant's co-pending application Serial No. 655,934 filed February 9, 1933 of which the present application is a division, and is similar in the general construction and mode of operation of its various parts to the automatic welt sewing machine disclosed in applicant's Patent No. 1,952,770 dated March 27, 1934, and in the patent to Topham and the present applicant No. 1,616,714 dated February 8, 1927.

It is a principal object of the present invention to provide an automatic machine, having means for sewing or otherwise securing together the upper and sole, or upper, welt and insole of a shoe, a shoe supporting jack, and means for relatively moving the jack and operating devices to transfer the point of operation progressively around the shoe, which is well adapted for the simultaneous performance of an upper lasting operation to correctly position the successive portions of the upper for fastening together.

It is more specifically an object of the invention to provide an automatic machine of the general type disclosed in the application and patents above referred to which is adapted to perform an upper lasting operation simultaneously with the welt sewing operation so that a separate upper lasting operation is rendered unnecessary, and more particularly the use of an automatic side lasting machine such, for instance, as is disclosed in the patents to Lawson No. 1,706,619 dated March 26, 1929, and No. 1,854,204, dated April 19, 1932, Other objects of the invention are to simplify and improve the construction and mode of operation of various parts of welt shoe sewing machines, both of the automatic type above referred to, and of the type in which the shoe is presented to the machine while held in the hands of the operator.

With these objects in view, one feature of the present invention contemplates the provision, in an automatic welt sewing machine of the type above referred to, of a lasting gripper and means for actuating and controlling the gripper in timed relation to the movement of the jack in transferring the point of operation of the stitch forming devices about the shoe to draw the desired portions of the upper tightly into position during the operation of the stitch forming devices in attaching the welt and upper to the insole.

Other features of the invention contemplate the provision of novel and improved means for supporting and actuating lasting grippers and for controlling the operation of the lasting gripper and welt slashing mechanism during the transfer of the operation about the shoe.

The several features of the invention consist also in certain devices, combinations and arrangements of parts hereinafter described and claimed, which together with the advantages to be obtained thereby will be readily understood by one skilled in the art from the following description taken in connection with the accompanying drawings, in which: Fig. 1 is a view in front elevation of an automatic lasting and welt sewing machine embodying the several features of the present invention; Fig. 2 is a view in right side elevation of the machine head, the parts being shown in sewing position just prior to throwing the welt slashing mechanism into operation; Fig. 3 is a view of the machine head in front elevation, the parts being shown in stopped position; Fig. 4 is a view in right side elevation, illustrating particularly the needle and lasting gripper mechanisms and actuating cams; Fig. 5 is a view in right side elevation of the control mechanism for throwing the welt slasher into and out of operation, the parts being shown in position just prior to the beginning of the welt slashing; Fig. 6 is a view similar to Fig. 5 with the welt slashing mechanism in operation; Fig. 7 is a detail sectional view taken on the line 7—7 of Fig. 6;

Fig. 8 is a view similar to Figs. 5 and 6, the parts being shown in position just prior to throwing the welt slashing mechanism out of operation; Fig. 9 is a view similar to Figs. 5, 6 and 8, showing the welt slashing mechanism out of operation; Fig. 10 is a sectional view, taken on the line 10—10 of Fig. 8; Fig. 11 is a detail view illustrating the welt slashing mechanism with the welt slashing knife in retracted position; Fig. 12 is a view similar to Fig. 11, showing the knife in its advanced position making a slashing cut in the welt; Fig. 13 is a plan view of the parts shown in Fig. 12; Fig. 14 is a detail sectional view, taken on the line 14—14 of Fig. 12; Fig. 15 is a perspective view showing the relative positions of the welt and the knife in slashing the welt; Fig. 16 is a detail sectional plan view showing particularly the cam and certain of its operating connections for throwing the lasting and welt slashing devices into and out of operation; Fig. 17 is a detail plan view of the feed carriage and the parts supported thereon; and Fig. 18 is a detail view in front elevation, partly in section, of the lasting grippers.

The welt shoe sewing machine for sewing the welt to the upper and insole of a shoe while supported on a last herein disclosed as embodying in a preferred form the several features of the present invention, comprises a sewing head generally indicated at 50 within which the sewing and side lasting instrumentalities are housed, a shoe supporting jack comprising a toe support 52 and a heel support 54 pivotally secured thereto, a supporting base 56 within which is housed the supporting and actuating mechanisms for imparting the required feeding, turning and tipping movements to the jack, and a driving and stopping unit for the machine which is housed in a casing 58 on the base adjacent to the sewing head 50.

As has been stated, the general construction and mode of operation of the various parts of the illustrated machine are similar to the corresponding parts of the automatic welt sewing machine disclosed in applicant's Patent No. 1,952,770 and in the patent to Topham and the present applicant No. 1,616,714. The machine is completely automatic in operation, the shoe being supported on the jack during the sewing operation, and tipping and rotating movements being imparted to the jack in timed relation to the feed of the shoe so as to maintain the shoe at all times in the proper position with relation to the sewing instrumentalities. At the completion of the sewing operation, the driving mechanism for the cam shaft in the head of the machine, and for the pattern cam shaft in the base, from which the jack is actuated and controlled, is thrown out of operation, and an auxiliary mechanism is thrown into operation which acts to perform certain additional operations including the completion of the rotation of the pattern cam shaft, the depression and outward movement of the jack away from the sewing instrumentalities, and the reverse rotation of the jack to its original position.

The shoe supporting jack comprising the toe support 52 and the heel support 54 pivotally secured thereto, is supported, actuated and controlled as in the machines of the patents above referred to. At its lower end the jack is mounted by a universal joint on the forward end of a horizontal arm or lever 590 which is pivotally mounted on a support 592 to move in a vertical plane, which support is pivotally mounted for movements in a substantially horizontal plane on a supporting member 594. The forked lower end of the member 594 carries trunnions 596 arranged to engage with corresponding bearings 598 in the machine frame. The movements of the several members of the jack are controlled through connections actuated by cams on the pattern cam shaft.

As in the machine of the patents above referred to, the devices of the present machine for operating upon a shoe comprise a curved hooked needle 60, a looper 62, a thread finger 64, a thread holder or gripper 66, a channel guide 68, and a welt guide 71. In addition to these devices the present machine also is provided with a side lasting gripper comprising jaws indicated respectively at 72 and 74. Cooperating movements are imparted to these devices for operating on the shoe from a sewing cam shaft 76 (see Fig. 1) which is mounted to rotate on a horizontal axis in bearings in the sewing head 50, and is provided at one end with a spiral gear 78 arranged to mesh with a corresponding spiral gear 80 which is formed integrally with a clutch sleeve 82 loosely mounted to turn on a vertical drive shaft 84 of the machine. The shaft 84 is continuously driven through reduction gearing from an electric motor mounted in the upper end of the casing 58.

The control mechanism for imparting positioning and feeding movements to the jack, are arranged to impart a continuous feeding movement to the shoe past the stitch forming devices. To assist in the feeding of the work, the needle is mounted to reciprocate with the work in the line of feed. With the present construction, the needle 60 is mounted on a support or frame 86 (see Figs. 2 and 17) which extends rearwardly of the machine, and is sleeved to turn on a vertical pivot shaft 88. A rearwardly extending arm 90 formed on the hub of the support 86, carries a cam roll 92 which is arranged to engage in a peripheral cam groove in the cam disk 94 on the sewing shaft 76, so that a reciprocatory movement is imparted to the support and the needle mounted thereon in the line of feed in timed relation to the sewing cycle. An exceptionally simple and sturdy construction of the needle support is thus provided, which for the short distance of reciprocation imparted to the needle, provides a substantially straight line movement of the needle in the line of feed, and has the further advantage that it makes possible a simplified and more compact arrangement of the moving parts in the head of the machine.

The machine illustrated in the drawings is provided with a side lasting gripper which acts progressively along the sides of the shoe to pull in and position the side portions of the upper with relation to the welt and insole in advance of the sewing operation. In the illustrated construction, the operation of the side lasting gripper is automatically controlled as the sewing operation progresses around the shoe to cause the gripper to operate intermittently and progressively along the side of the shoe in time with the stitch forming devices, to cease operating as the sewing proceeds about the toe which has preferably been previously molded, and finally to resume operation again as the sewing is continued along the other side of the shoe. As shown in Figs. 2 and 4 the gripper is located adjacent to and immediately in advance of the needle in the line of feed, and is mounted on the needle support to move with the needle in the line of feed. The jaw 72 comprising one of the cooperating members of the gripper is rigidly formed on a curved carrier arm 270 which is provided with an offset portion 272 pivotally secured at 274 to the needle support 86. At its upper end the arm 270 is connected through a link 276 to a downwardly extending arm of a lever 278 sleeved to turn on a pivot shaft 280 mounted on the machine frame. The lever 278 is rocked about its pivot to impart movements to the gripper jaw 72 toward and away from the work by means of a cam actuated lever 282 pivoted on the shaft 280, and provided at one end with a cam roll 284 arranged to ride in a cam groove 286 formed in one face of the cam disk 166. At its forward end the cam lever 282 is pivotally connected to a curved rod 288 which is loosely fitted to slide in a sleeve bearing 290 formed in a forwardly extending arm of the lever 278. A compression spring 292 coiled about the rod 288 between a nut 294 on the rod and the sleeved portion of the lever 278 tends to rotate the lever 278 in a clockwise direction to hold the forwardly extending arm in yielding engagement with a collar 296 on the pivoted upper end of the rod 288. With this arrangement of the parts, the lever 278 is moved yieldingly in one direction under the pressure of the spring 292 to move the gripper jaw 72 towards the work, and is moved positively in an opposite direction to retreat the gripper jaw by the engagement of the sleeved portion 290 of the lever 278 with the shoulder 296. Cooperating with the gripper jaw 72 is a second jaw 74 pivotally mounted thereon at 298, and provided with a forwardly extending arm 300 which is connected by means of a link 302 to the forward end of a cam lever 304 loosely pivoted to turn on the pivot shaft 280, and provided at its rear end with a cam roll 306 which engages in a corresponding cam groove 308 in the face of the cam disk 166. In order to provide a yielding gripping engagement of the two jaws, the link 302 is arranged to slide in a corresponding aperture 312 in the forward end of the cam lever 304. The movement of the link 302 with relation to the cam lever 304 is limited in one direction by the engagement of the lever 304 with a collar 314 formed on the link 302, and in the other direction by means of a compression spring 316 coiled about the upper end of the link 302 between the sleeved portion of the lever 304 and an adjustable nut 318 on the link 302.

The gripping jaws engage the upper close to the sewing point and are actuated during each stitch forming cycle to tension the upper until the needle enters the work, at which time the grasp on the upper is released, and the upper is left free to be drawn into its final position against the shoulder of the insole. The pivotal point 274, about which the gripper carrier 270 swings, is located above and to the rear of the sewing point in such a position that the gripping jaws mounted on the carrier move over the sole of the shoe simultaneously with their rising movement so that the movement of the gripper carrier imparts a combined updraw and overdraw movement to the jaws. A simple and efficient lasting gripper mechanism is thus provided, and comparatively simple and direct connections between the gripping jaws and the cam shaft can be utilized for closing the jaws and giving them the required upper-tensioning movements.

To enable the gripper to be thrown out of operation, the lever 278 is provided with a rearwardly extending arm provided with a bearing surface 320 arranged for engagement with the upper end of a lengthwise movable and vertically arranged control bar 322 which is journalled through a bearing 324 in the machine frame. With this construction and arrangement of parts, a vertical upward movement of the control 322 will move the lever 278 about its pivot in a counterclockwise direction against the pressure of the spring 292 to raise the gripper jaw 72 and the jaw 74 cooperating therewith out of operative engagement with the work against the pressure of of the spring 292 to raise the gripper jaw 72 and to throw the gripper jaws out of and into operation when predetermined points on the shoe are reached during the sewing operation through connections to the pattern cam shaft, as will be hereinafter described.

The novel and improved welt slashing device of the machine (see Figs. 2, 3 and 5 to 15 inclusive) comprises a welt slashing knife 330 which is arranged to slide in a guideway formed in a bracket 334 on the machine frame, and is provided with an oblique cutting edge indicated at 332. In order to position the welt with relation to the welt slashing knife, the welt is arranged to pass over a guiding surface 336 formed in the bracket 334, and is also supported on a curved guiding surface 338 formed on a guiding member 340 which is pivotally secured at 342 to the bracket 334. The welt is positioned laterally in the guiding member 340 between a side plate 344 forming part of the member 340 which engages the channel edge of the welt and an adjustable block 346 which is mounted on the end of a pin 348 journaled to slide in a bearing 349 formed in the bracket 334 and screw-threaded at its other end to receive a sleeve nut 350. A knurled head 351 on the sleeve nut 350 provides a convenient means for enabling the operator quickly and accurately to adjust the position of the block 346 to conform to the width of the welt strip. The guiding member 340 is provided at its rear end with a cam roll 352 which is arranged to engage with a cam surface 354 on the under side of the knife, so that on each forward reciprocation of the knife, the cam roll 352 riding on the surface 354, will cause the guiding member 340 to be rotated about its pivot 342 to bring the welt into the path of the knife. For tensioning the welt and to maintain it accurately in position on the guiding surfaces above described during the operation of the knife, a frictional braking device is provided comprising a pin plunger 360 journaled in the guiding member 340, and a compression spring 362 coiled about the plunger between the guiding member 340 and a frictional disk 364 formed on the inner end of the plunger. A collar 366 mounted on the outer end of the plunger 360 and held in place by a cross pin 368, limits the movement of the plunger under the pressure of its spring 362.

In the preferred form of this feature of the invention herein disclosed, the welt slashing knife is mounted to reciprocate towards and from the welt in the line of feed of the welt with the flat side of the knife blade in a plane extending parallel to the flash side of the welt in a direction transversely of the welt, and with the obliquely extending knife edge arranged to cut a slash ending at a fixed distance in from the channel edge of the welt as determined by the location of the guiding surface formed by the side plate 344 with relation to the reciprocating knife. The guiding surface 338 is curved and is located with relation to the braking device above described and the cooperating surface 336, so that the movement of the guiding member 340 about its pivot as the knife is advanced will bend the welt and cause the knife to cut tangentially into the curved outer or flesh surface of the welt. The movement of the guiding member 340 and welt supported thereon into the path of the knife is limited to leave approximately a $\frac{1}{32}''$ thickness of welt below the plane of movement of the knife blade.

As best shown in Figs. 12 and 15, the cooperative movements of the welt guiding member 340 and the oblique blade of the welt knife cause a shearing cut to be made in the flesh side of the welt which extends partially through the welt strip to within a predetermined distance of the grain side of the welt, and at the same time extends across the flesh side of the welt nearly to the welt channel. With this arrangement of the welt slashing device, it will be seen that a slashing cut will be made which will leave substantially the same amount of stock intact so as not to unduly weaken the welt, and yet to permit it to be readily turned about the toe of the shoe, regardless of any variations in the thickness or the width of the welt being used. In view of the fact that the cut will extend only to a predetermined depth, and thereafter run substantially parallel to the grain side of the welt, a wide latitude can be permitted in the adjustment of the forward throw of the knife blade without substantially affecting the efficiency of the device.

The connections through which reciprocating movements are imparted to the knife for slashing the welt, comprise a pinion 370 secured to a rock shaft 372, and arranged to engage with a rack 374 formed on one edge of the shank of the sliding knife 330. A second pinion 376 on the shaft 372 engages a gear segment 378 formed on a horizontally extending arm of a bell-crank 380 loosely sleeved to turn on the pivot shaft 160. The bell-crank lever 380 is oscillated about its pivot to reciprocate the welt slashing knife, when rendered operative, by means of a latch connection which is arranged to lock the bell-crank 380 to move with one of the cam actuating levers 158 for the looper. This connection comprises a latch 382 pivoted at 384 on the laterally extending arm of the bell-crank 380, and provided at its upper end with a flange 386 adjustably positioned by locking nuts 388 to engage and lock a laterally extending arm 390 of the cam lever 158 between the flange 386 and an abutment 392 on the bell-crank 380. A compression spring 394 seated in a recess formed in the bell crank 380 and arranged to bear against an arm 396 on the latch 382, tends to hold the latch in locking engagement with the arm 390 of the cam lever 158. The latch 382 is normally held in inoperative position out of engagement with the cam lever 158 to maintain the welt slashing device inoperative, by means of a lever 398 which is loosely mounted to turn on a pivot shaft 400, and is provided with an abutment 402 arranged to engage with a nib 404 on the lower end of the latch 382. A tension spring 407 connected at one end to the lever arm 398, tends to maintain the abutment 402 in engagement with the nib 404 on the latch 382 to hold the latch in its inoperative position.

The latch release lever arm 398 is moved away from the latch 382 against the pressure of the spring 407 to release the latch and permit the bell-crank 380 to be locked into operative relationship to the cam lever 158, and is later caused to return and disengage the latch through connections which are operated from the pattern cam shaft of the machine to automatically cause the slashing of the welt only around the toe portion of the shoe. These connections comprise a bell-crank lever 408 which is pivotally mounted to turn on the pivot shaft 400, and has an upwardly extending arm provided at its upper end with a V-shaped cam surface 410 which is arranged to engage with a corresponding V-shaped detent pin 412 journalled to slide in a bearing 414 in the upper end of the latch release lever 398. A spring 413 coiled about the pin 412 between a shoulder formed in the bearing 414 and an enlarged portion of the pin tends to hold the pin in a depressed position in the path of the cam surface 410 of the lever 408. The horizontal arm of the bell-crank 408 is connected through a link 416 to a lever arm 418 (see Figs. 1, 3 and 16) which is secured to the forward end of a rock shaft 420 journalled in a bearing 422 in the base 56 of the machine. A downwardly extending arm 423 secured to the rear end of the rock shaft 420, is connected by a horizontal link 424 to an arm 426 secured to a vertical rock shaft 428. Another arm 430 on the rock shaft is connected by a link 432 to one end of a cam actuated lever 434 which is loosely mounted to turn on a shaft 438, and carries at its other end a cam roll 440 which engages with a cam 442 on the pattern cam shaft 444 of the machine. A tension spring 450 connected at one end to the horizontal arm of the bell-crank 408 and at its other end to the machine frame, tends to maintain the upper arm of the bell-crank to the left, as shown in Fig. 2, and acts through the intervening connections described, to hold the cam roll 440 in engagement with its cam 442. The lower end of the control shaft 322 for throwing the side lasting grippers out of operation is also pivotally connected at its lower end at 452 to the lever arm 418 (see Figs. 1 and 3), so that the operation of this mechanism is also controlled from the cam 442.

In the performance of the sewing and side lasting operations around the shoe sole, the side lasting grippers commence operating when the machine is thrown into operation from the starting position at the shank, are thrown out during the sewing operation around the toe, and are again rendered operative as the stitching operation returns along the other side of the shoe to the shank. The slashing devices, on the other hand, are inoperative at the beginning of the sewing operation, and up to a point somewhat in advance of the time when the point of operations reaches the toe, and are then thrown into operation only to slash that portion of the welt which is to be laid about the toe, being then again disconnected. The several steps in the operation of the mechanism controlled by the cam 442 for automatically throwing the side lasting and welt slashing mechanisms into and out of operation are illustrated in Figs. 2 and 5 to 9 inclusive. As shown in Figs. 9 and 16, the machine is in stop position with the follower 440 of lever 434 on a high portion of its cam 442, the upper arm of the bell-crank 408 being shown at the limit of its movement to the right, and with the control bar 322 fully raised into engagement with the lever 278 to raise the lasting gripper out of operating position. Upon starting the machine, the cam roll 440 rides onto a low portion of the Baltimore cam 442, causing the connecting link 416 to be depressed, moving the V-shaped portion 410 of the bell-crank 408 past the spring detent 412 to the extreme left as shown in Figs. 2 and 5, and depressing the control rod 322 to allow the lever arm 278 to move about its pivot under the pressure of the spring 292, so that the lasting gripper is brought into operating position with relation to the work. In order to start the slashing devices as the point of operation approaches the toe of the shoe, the cam roll 440 is arranged to ride onto a somewhat higher portion of its cam, slightly raising the arm 418 and moving the bell-crank 408 about its pivot, so that the upper end 410 of the bell-crank moves the latch release lever 398 away from the latch 382 to permit the latch under the pressure of its spring 394 to be moved into locking engagement with the arm 390 of the looper actuating cam lever 158. The parts in this position are illustrated in Fig. 6. The control bar 322 has not at this time been raised sufficiently to interfere with the operation of the side lasting grippers. When the toe is reached, the cam roll 440 rides onto a still higher portion of its cam 442 to further raise the lever arm 418, moving the bell-crank 408 to the position shown in Fig. 8, and at the same time causing the control bar 322 to engage with and rock the lever 278 to throw the lasting grippers out of operation. While the point of operation is progressing about the toe, the cam roll 440 rides onto a still higher portion of the cam 442, further raising the arm 418 and moving the upper end of the bell-crank 408 to its extreme position to the right, as shown in Fig. 9.

This movement of the bell-crank 408 causes the V-shaped cam 419 to ride under the spring detent 412 as the further movement of the latch release lever 398 is positively arrested by engagement with the stop 462, so that the lever 398 is permitted to move again to the left under the pressure of its spring 407 to disengage the latch 382 and disconnect the slashing mechanism (see Fig. 9). As the point of operation now passes from the toe to the side portion of the sole, the cam roll 440 rides again onto the low portion of the cam 442, depressing the control bar 322 to permit the resumption of the side lasting operation, the parts being now in the position shown in Fig. 4.

The nature and scope of the present invention having been indicated, and a machine embodying the several features of the invention having been specifically described, what is claimed is:

1. In a lasting and sewing machine the combination of inseam sewing and lasting instrumentalities including a needle, a lasting gripper, a shoe supporting jack, means operating in accordance with a predetermined pattern for relatively moving the jack and said instrumentalities to transfer the point of operation about the shoe, and means for actuating and controlling the lasting gripper in timed relation to the relative movements of the jack and said instrumentalities in accordance with said pattern in transferring the point of operation about the shoe to draw the desired portions of the upper tightly into position during the operation of the stitch forming devices in sewing the inseam.

2. In a lasting machine, the combination of fastening means, means for tensioning successive portions of an upper over the bottom of a last, a shoe supporting jack, means for relatively moving the jack and the fastening and tensioning means to transfer the point of operation consecutively about the shoe, and means including a pattern cam actuated in timed relation to the progress of the point of operation about the shoe for controlling the operation of the tensioning means arranged to render said tensioning means inoperative during the transfer of the point of operation about a predetermined portion of the shoe sole.

3. In a lasting and sewing machine, the combination of sewing and lasting instrumentalities including a needle, a gripper, means for operating the gripper to tension successive portions of the upper, a shoe supporting jack, means for relatively moving the jack and said instrumentalities to transfer the point of operation about the shoe, and means including a pattern cam actuated in timed relation to the progress of the point of operation about the shoe for rendering inoperative said gripper operating means during the continued operation of said sewing instrumentalities about a predetermined portion of the shoe.

4. In a lasting machine, the combination of fastening means, means for tensioning successive portions of an upper over the bottom of a last, a shoe supporting jack, mechanism for imparting turning and positioning movements to the jack to transfer the point of operation about the shoe, and means controlled in timed relation to said jack actuating mechanism to render said tensioning means inoperative during the transfer of the point of operation about a predetermined portion of the shoe sole.

5. In a lasting and sewing machine, the combination of sewing and lasting instrumentalities including a needle, a gripper, means for operating the gripper to tension successive portions of the upper, a shoe supporting jack, means for imparting feeding, tipping and turning movements to the jack to transfer the point of operation about the shoe, and means acting in timed relation to the movement of the jack to render inoperative said gripper operating means during the transfer of the point of operation about a predetermined portion of the shoe sole.

6. In a lasting and sewing machine, the combination of a shoe supporting jack, means for imparting continuous movement to the jack to transfer the point of operation about the shoe, a needle arranged during piercing contact with the work to move with the work in the line of feed, a gripper operating to tension successive portions of the upper and arranged during said tensioning movement to move with the work in the line of feed, and a stationary channel guide for positioning the work with relation to said sewing and lasting instrumentalities.

7. In a lasting and sewing machine, the combination of lasting and sewing devices comprising a needle, a movable support on which the needle is mounted to move with the work in the line of feed, and a gripper operating to tension successive portions of the upper mounted on said needle support to move with the needle in the line of feed.

8. In a lasting and sewing machine, the combination of lasting and sewing devices comprising a needle, a gripper operating to tension successive portions of the upper, a needle support moving in the line of feed during piercing contact of the needle with the work, and connections from said support for moving the gripper with the needle in the line of feed.

9. In a lasting and sewing machine, the combination with shoe guiding and positioning devices, of a needle, a gripper operating to tension successive portions of the upper, a needle support mounted to swing about a vertical pivot located at one side of the line of feed, and connections from the support for moving the gripper with the needle in the line of feed.

10. In a lasting and sewing machine, the combination of inseam sewing and lasting instrumentalities including a curved hook needle, a lasting gripper comprising jaws arranged to engage the upper close to the sewing point, a carrier upon which one of the jaws is rigidly supported pivotally mounted above and to the rear of the sewing point to cause the arm to impart a combined updraw and overdraw movement to the gripper, and means for actuating the gripper to tension the upper in timed relation to the operation of the stitch forming devices.

11. In a lasting and sewing machine, the combination of inseam sewing and lasting instrumentalities including a curved hook needle, a lasting gripper comprising jaws arranged to grasp the shoe upper close to the sewing point, a carrier upon which one of the jaws is rigidly supported, pivotally mounted above and to the rear of the sewing point to cause the arm to impart a combined updraw and overdraw movement to the gripper, a pivotal connection between the other gripping jaw and the carrier, a cam and suitable connections for actuating said last mentioned jaw to grasp and release the upper, and a cam and suitable connections for actuating said carrier to tension the upper.

12. A welt sewing machine having, in combination, stitch forming devices including a needle for sewing a welt to a shoe, welt slashing devices, a gripper for tensioning successive portions of an upper over the bottom of a last, a cam actuated in timed relation to the progress of the point of operation about the shoe, and connections controlled by said cam to render said slashing devices operative to slash only that portion of the welt to be laid around the toe and for controlling the operation of said gripper to operate only on the side portions of the shoe.

13. In a lasting and sewing machine, the combination of sewing and lasting instrumentalities, including a needle, a gripper, means for operating the gripper to tension successive portions of the upper, welt slashing devices, a shoe supporting jack, and a pattern mechanism for imparting feeding, tipping and turning movements to the jack to transfer the point of operation about the shoe, said pattern mechanism comprising a cam and connections actuated by said cam to render inoperative said gripper during the transfer of the point of operation about the toe, and for rendering the welt slashing mechanism operative to slash only that portion of the welt to be laid about the toe.

14. In a lasting and sewing machine, the combination of sewing and lasting instrumentalities including a needle, a gripper, means for operating the gripper to tension successive portions of the upper, a shoe supporting jack, and a pattern mechanism for imparting feeding, tipping and turning movements to the jack to transfer the point of operation about the shoe, said pattern mechanism comprising a cam and connections actuated by said cam to render inoperative said gripper during the transfer of the point of operation about the toe.

ALFRED R. MORRILL.